(12) United States Patent
Mickley

(10) Patent No.: US 7,017,933 B2
(45) Date of Patent: Mar. 28, 2006

(54) LIGHTED GUIDE POST ASSEMBLY FOR BOAT TRAILERS

(76) Inventor: Anthony M. Mickley, 1007 S. Lakeside Dr., Lake Worth, FL (US) 33460

( * ) Notice: Subject to any disclaimer, the term of this patent is extended or adjusted under 35 U.S.C. 154(b) by 0 days.

(21) Appl. No.: 10/855,678

(22) Filed: May 27, 2004

(65) Prior Publication Data

US 2005/0263982 A1   Dec. 1, 2005

(51) Int. Cl.
*B60P 3/10* (2006.01)
(52) U.S. Cl. .................. 280/414.1; 362/485; 362/496; 362/493; 362/249
(58) Field of Classification Search ............ 280/414.1; 362/485, 496, 493, 545
See application file for complete search history.

(56) References Cited

U.S. PATENT DOCUMENTS

| | | | |
|---|---|---|---|
| 4,197,050 A | | 4/1980 | Larson |
| 4,360,859 A | | 11/1982 | Ziaylek, Jr. |
| D267,899 S | | 2/1983 | Kolm et al. |
| 4,445,163 A | | 4/1984 | Ziaylek, Jr. |
| 4,529,217 A | | 7/1985 | Wood |
| 4,715,768 A | * | 12/1987 | Capps .................. 414/535 |
| D308,110 S | | 5/1990 | Ziaylek, Jr. |
| D313,194 S | | 12/1990 | Francisco |
| 5,060,121 A | | 10/1991 | Cunningham et al. |
| 5,157,591 A | | 10/1992 | Chudzik |
| D351,115 S | * | 10/1994 | Valdez ..................... D10/114 |
| 5,360,226 A | * | 11/1994 | Gussler, Jr. et al. ..... 280/414.1 |
| 5,534,718 A | * | 7/1996 | Chang .......................... 257/98 |
| 5,544,022 A | | 8/1996 | Blackard |
| 6,203,181 B1 | * | 3/2001 | Gross ......................... 362/486 |
| 6,309,086 B1 | * | 10/2001 | Tomlinson ................. 362/249 |
| 6,472,823 B1 | * | 10/2002 | Yen ............................ 315/112 |
| 6,682,210 B1 | * | 1/2004 | Ford et al. ................. 362/493 |
| 2003/0193801 A1 | * | 10/2003 | Lin ............................ 362/249 |
| 2003/0210546 A1 | * | 11/2003 | Chin ........................... 362/249 |
| 2004/0004844 A1 | * | 1/2004 | Ryan, Jr. ..................... 362/545 |

* cited by examiner

*Primary Examiner*—Lesley D. Morris
*Assistant Examiner*—Marlon Arce-Diaz
(74) *Attorney, Agent, or Firm*—McHale & Slavin

(57) ABSTRACT

A lighted guide assembly for boat trailers used in centering a boat on a trailer during the loading and unloading process. The lighted guide post assembly provides running and braking lights for the trailer that can be seen from the rear of the boat trailer despite the height or length of a trailered boat. The lighted boat guide post assembly has first and second uprights each formed from a partially or substantially transparent tube with directional lights placed therein. The lighted boat guide post is electrically coupled to the boat trailer towing vehicle and provides lighting that extends from the trailer frame to the top of each guide post.

19 Claims, 2 Drawing Sheets

LIGHTED GUIDE POST ASSEMBLY FOR BOAT TRAILERS

FIELD OF THE INVENTION

This invention relates to boat trailers and in particular to a boat trailer lighting assembly incorporated into a boat centering guide post assembly.

BACKGROUND

While there are various types of loading mechanisms that have been developed for aiding in the loading and unloading of a boat from a trailer, boat centering guide post become universally accepted. Before the use of the self centering guides, any size boat could be difficult to load and unload due to current, cross winds, and single person operations. The situation is compounded with longer boats where the length of the boat could make it nearly impossible to control during certain situations if guide posts were not available.

The conventional boat centering guide post is positioned at the outmost side of a trailer to prevent lateral movement of a boat during the loading and unloading process. For instance, should a boat operator attempt to load a boat in a cross current or wind, the boat can be pushed against the guide post wherein the guide post will flex but otherwise cause the boat to be centered on the trailer.

In operation, the boat loading process requires the operator of the boat to either float the boat onto the trailer or hook a winch line from the trailer to the bow of a boat to be loaded. In either event, the propulsion system of the boat is either shut down or becomes ineffective at such slow speed wherein any wind or current could move the transom of the boat but for the positioning of the centering guide posts. The majority of the boat trailer is typically submerged during this process and the boat is literally floated on to the trailer with the center guide posts positioning the boat over the trailer bunks. When the trailer is pulled from the water, hopefully the boat is aligned to the trailer as provided by the guide posts.

While the boat centering guides have made boat loading and unloading an effortless process, the ease of use has led to the transporting of even larger boats which results in another problem in which this invention addresses.

One of the problems arise in the ability to view the trailer operating lights whenever a boat is on a trailer. Trailering of a boat necessitates proper lighting for the safety of those following the boat trailer as well as for the safety of the boat and trailer. The difficulty in viewing of the trailer lighting is proportionately enhanced when a larger boat is transported. The self centering guide posts are typically mounted near the trailer wheels since the wheel location must be the outermost position of the boat trailer to provide the necessary boat stability during transport. The lights may also be mounted to the trailer along the outermost area, which typically results in the placement near the wheel location.

By way of example, driving at night posses unique dangers to those following a boat since the trailer lights may be blocked from view should the boat extend any distance past the rear of the trailer. Thus, the operator of an automobile traveling behind the trailered boat may only see one side of the trailer lights. If the operator of an automobile traveling behind the trailer boat is driving close to the boat, both side lights obscured. Unfortunately, if the boat being trailered includes multiple outboard engines, inboard/outboard engines, or is a longer boat then the conventional lights mounted on the trailer would be obscured from most every position when viewed from the rear of the trailer.

While the centering guide posts provide a tremendous improvement in the safe loading and unloading boats, the ease of operation has resulted in the consuming public transporting boats more frequently and, of larger boats, placing the driving public at risk when the boat trailer lights cannot be seen.

Various inventors have recognized the need for providing lighting on or near the rear of a trailered boat. U.S. Pat. No. 5,544,022 discloses a portable set of boat trailer light assemblies; this disclosure requires fishing pole holes in order to support the light. U.S. Pat. No. 4,360,859 discloses a boat light having resiliently flexible and adjustable mounts. U.S. Pat. No. 4,445,163 discloses a boat light for use in transom mounting. U.S. Pat. No. 5,060,121 discloses a sealed tail light for a boat trailer. U.S. Pat. No. 5,157,591 discloses an attachable auxiliary vehicle lighting system. U.S. Pat. No. 4,197,050 discloses a typical boat guide assembly that is used on a boat trailer.

U.S. Pat. No. 4,529,217 discloses yet another boat trailer centering device as does U.S. Pat. No. 4,715,768. It should be noted on each of these boat trailer guides that the guide assemblies are located on the outermost portion of the boat trailer typically adjacent to the boat trailer wheel assembly.

Design Pat. No. 351,115 illustrates a guide post with a raised indicator light. This device assists the operator of the towing vessel to determine trailer position when the trailer is submerged.

Thus, what is lacking in the art is a light assembly that replicates the lighting functions of the towing vehicle to provide an enhanced level of safety to the driving public and the owner of the boat.

SUMMARY OF THE INVENTION

The present invention satisfies these needs through provision of an improved boat guide post that is used for centering a boat on a boat trailer and for providing running and braking lights for the boat trailer. The lighted boat guide assembly has first and second uprights each formed from tubular shaped material. The guide post is similar in most aspects to the conventional guide post with the improvement of either a partially transparent cross section throughout substantially the entire length of the tube, or a transparent post with a directional light placed therein. The lighted boat guide posts are electrically coupled to the boat trailer towing vehicle and effectively provide lighting that extends from the trailer frame mounting section to the top of each guide post.

Thus, a primary objective of the invention is provide a lighted guide post that can be seen from the rear of the boat trailer despite the length or style of the trailered boat and dispite weather conditions, or natural light conditions.

Another objective of the invention is to provide a lighted guide post wherein the length or any length thereof of the guide post operates as the brake light, turn signal, and/or marker light.

Still another objective of the invention is to employ direction LED lighting for localized positioning of lighting elements.

Another objective of the invention is to employ the use of prismatic films that permit strategic placement of lighting elements wherein the prismatic film operates to diffuse and reflect the lighting to provide illumination along the length of the guide post.

Still another objective of the invention is to place all electrical components and connections at the top of the guide posts providing the advantage that no saltwater intrusion is possible since no submersion of the guide top is possible.

Yet another objective of the invention is to place lighting at an elevated position above wheel misting, which occurs when the pavement is wet, to prevent obscuring of the lights during rain.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
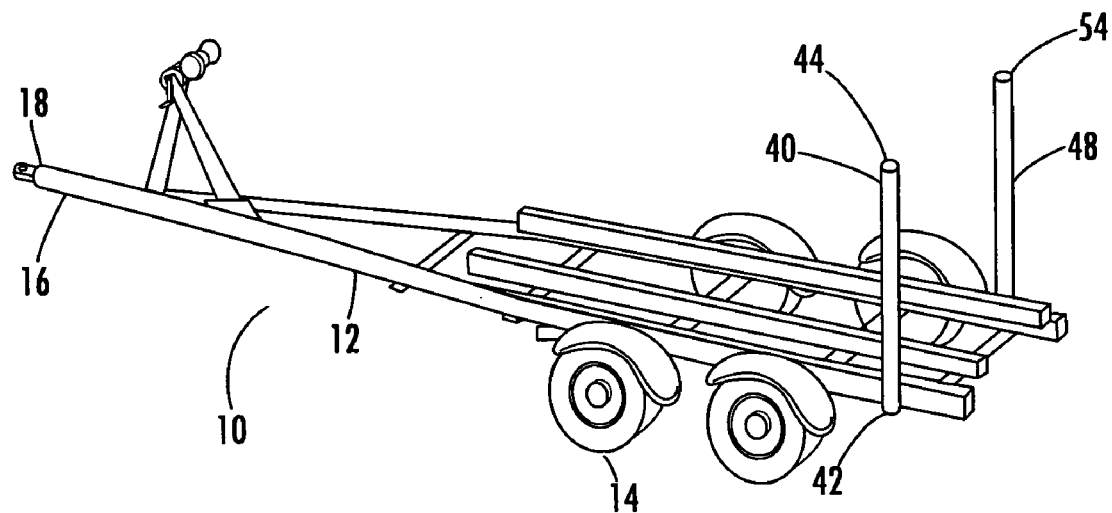
FIG. 1 is a pictorial of a boat trailer with the illuminated lighted guide post assembly of the instant invention.

FIG. 1 depicts a boat trailer 10 defined by a frame 12 with wheels 14 located on the outermost section of the frame. A tongue 16 includes a hitch 18 for use in coupling to the towing vehicle. A winch 28 is used to secure a boat, not shown, onto the trailer. The use of a trailer with a winch is only for illustrations purposes, the trailer may also be a float-on style trailer where no winch is necessary.

The guide post 40 is mounted to the frame 12 with the proximal end 42 secured to the frame and a distal end 44 extending a predetermined distance above the frame. Guide post 40 is positioned on the port side of the boat/trailer providing a signal that would be repeating all signals provided by towing vehicle. Similarity, guide post 48 is positioned on the starboard side of the boat/trailer providing a signal that would be repeating all signals provided by the towing vehicle. The guide posts 40 and 48 operate to center a boat onto the frame 12 during the loading process. The distal ends 44 and 54 extending about the side edge the boat wherein frame submerging, for either loading or unloading wherein, permits the distal ends 44 and 54 to remain above the water and thus are the preferred location for electrical connections and sensitive circuitry.

Figure 2:
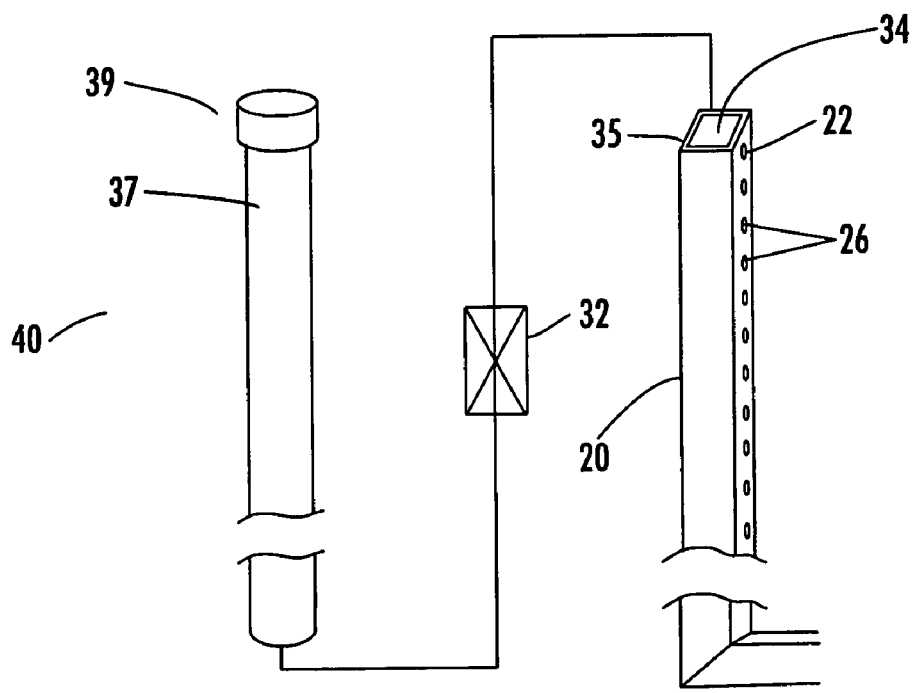
FIG. 2 is an exploded view of a square tube lighted guide post.

FIG. 2 illustrates the preferred guide post 40, having a base 20 which is bolted to the frame 12. The base is typically formed from a hollow square shaped steel tube defined by four side walls. One side wall 22 has a plurality of aperture 26 corresponding with a light source 34. The light source may consist of a light strip having LED spaced apart for projecting through the base. A illumination circuitry 32 is positioned along the upper end 35 of the base 20 for use in converting vehicle light signals to the appropriate LED transmission. This illumination circuitry may include LED sequencing to further draw attention to the trailer to emergency braking, parking and so forth. The main purpose of the illumination circuitry placement is to prevent water submersion. A plastic tube 37 with cap 39, which are made from clear PVC or acrylic, is positioned over the base 20. The LED lighting projects through the tube 37 and should the tube become fogged due to age, wear, sunlight fading, or choice of clarity by the manufacturer. The plastic tube 37 is allowed to rotate to prevent damage to the boat while protecting the base.

The illumination circuitry provides repeater service of braking, turning, parking, and running lights for the towing vehicle.

Figure 3:
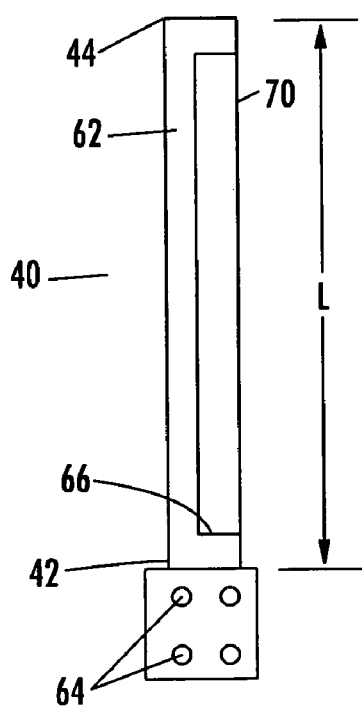
FIG. 3 is side view of a guide post having a prismatic film.
Figure 4:
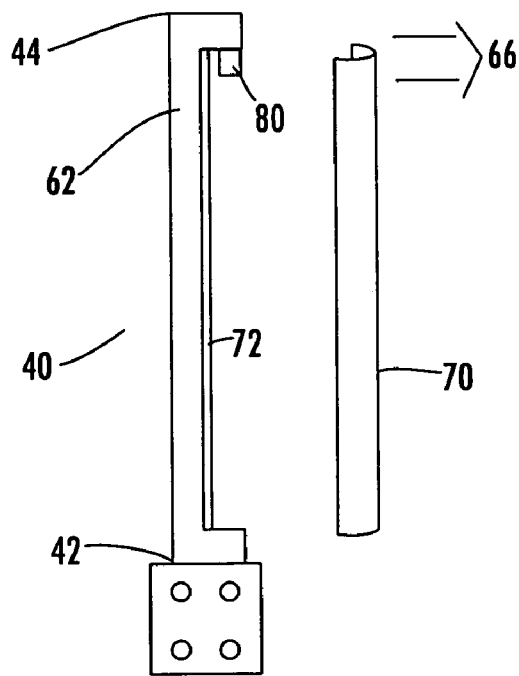
FIG. 4 is an exploded side view of the lighted guide assembly employing a prismatic film.

Referring now to FIGS. 3 and 4, set forth an alternative embodiment depicting guide post 40 with a partially transparent cross section 70 throughout substantially the entire length thereof. The transparent cross section may consist of a prismatic lens or be a clear polycarbonate material with a illumination means and/or prismatic type film 72 located behind the cross section. Conventional lighting is located at the distal end of the guide post 40 wherein illumination occurs through the post by use of prismatic film. Placement of a lighting source in the distal end prevents water damage. It is well known that traditional incandescent bulbs require maintenance for the exposure to inherent in marine applications deteriorates the mounting of conventional light bulbs. Should water immersion occur, typically the corrosion is often so extensive that it seizes the bulb to the socket assembly, making the replacement of the bulb difficult and often resulting in physical damage to the socket. It is not necessary to submerge the distal ends of the guide posts during loading or unloading, so the need for sealed lamp ends is eliminated.

The illumination circuitry provides repeater service of braking, turning, parking, and running lights for the towing vehicle. Use of diffuse optical grade polycarbonate film with prismatic angles allows for uniform diffusion along the length of the film with minimal loss of light intensity. The light from the conventional bulbs is preferably a 12 volt halogen lamp with a filament orientation parallel with their respective inner reflective surface. This orientation provides downward intensity lighting so as to meet SAE requirements for trailer lighting.

The guide post 40 can be a sealed, waterproof assembly wherein a first opaque plastic shell 62 has threaded bolts 64, or other fasteners, extending perpendicularly therefrom for attaching the light to a trailer. The shell 62 has a central depression with lens screws 66 securing the transparent cross sectional lens section 70 to the shell 62. The transparent cross sectional lens is preferably curved to permit ease of sealing to the shell and elimination of edges that may nick the side of a boat. However, it should be noted that the lens may consist of most any optic shape and, in the case of lighting placed in the distal end or when LED circuitry is use, the lens 70 may not be sealed against the shell 62. The shell or lenses may be made from a durable, water resistant plastic, such as ABS, PVC, acrylic or polycarbonate, and if sealed against each other can be sealed with sealant, solvent or electronic welding.

FIG. 4 illustrates the use of a traditional incandescent bulb 80 located along the distal end of the shell 62. The lens mounting screws 66 removed from the shell and lens. The placement of the incandescent bulb 80, preferably a halogen lamp, at the distal end 44 eliminates submersion of the bulb 80 during the boat loading and unloading process. To enhance the lighting ability of the post a prismatic film 72 can be used with the lens 70.

Figure 5:
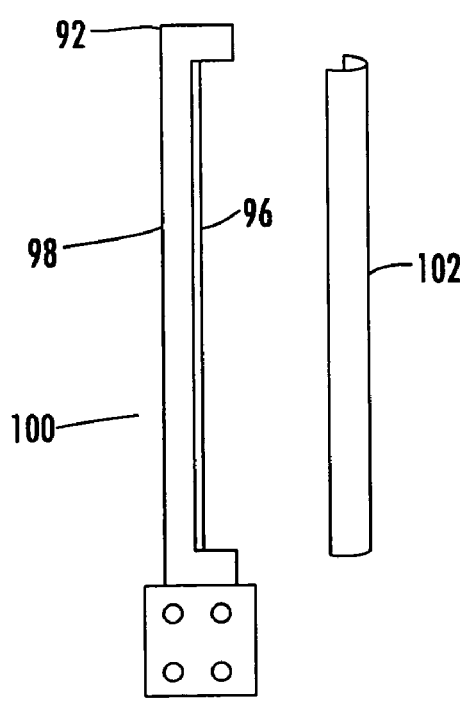
FIG. 5 is an exploded view of the lighted guide assembly employing an LED electrical circuit strip.
Figure 6:
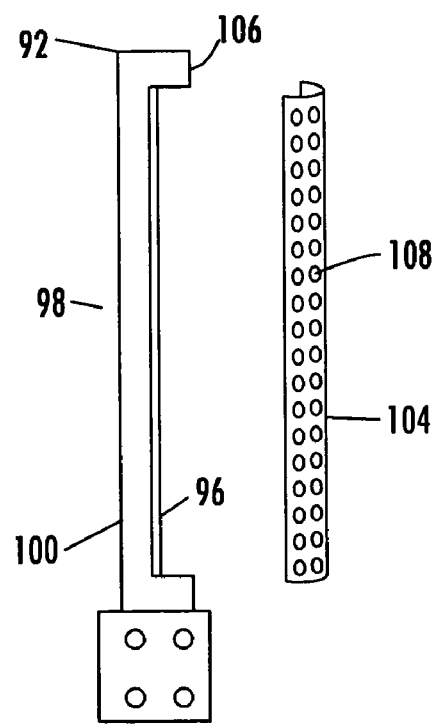
FIG. 6 is a cross sectional side view of the lighted guide assembly employing an LED circuit strip with a focal lens.

Referring to FIGS. 5 and 6, another alternative to LED lighting is the use of an LED array can be placed along the length of the guide post 100. Distal end 92 of the guide provides for a circuitry location that is not submerged. The embodiment employs the tubular shape with an array of LEDs encapsulated in resin and positioned within a specified parameter so as to deflect its full light output upon a surfaced light diffusion reflector.

In this embodiment, an integral light and circuit module 96 is suspended within the shell 98 and lens 102. The module 96 has an array of LEDs that are aimed at the lens 102 so that the LED shines through optic shapes 108 formed on the lens 104. The LEDs are electrically connected in conventional manner to a printed circuit board 106. A waterproof sealant, such as an epoxy resin, can be used to prevent moisture from entering lens assembly. The circuitry for the LED or incandescent is not detailed herein but is considered well known in the art and is used only as a repeater for the towing vehicle's rear lights. Such an electrical coupling is conventionally secured by use of pin and socket wiring harness standardized on most vehicles capable of towing a trailer.

In operation, the operator of a vehicle located behind the boat trailer will be able to see at least part of each lighted guide post. For instance, if a driver of the rear vehicle is able to see the left side of the trailer, the driver could view the entire guide post as well as the distal end of the other guide post. This will allow the driver to differentiate whether the trailer operator is indicating a left turn, right turn or is simply braking since without the ability to view each side post in relation to the other, it is most difficult to determine what the change in intensity creates.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A lighted boat guide post for use in centering a boat on a boat trailer and for providing running lights for the boat trailer, said lighted boat guide post comprising:
    a first and second guide post, each said guide post formed from a square hollow shaped tube having a proximal end and a distal end defining a length there between, each said guide post having a plurality of apertures placed in a side wall of said post; an LED strip shaped circuit board positioned within said post having a LED's corresponding to said apertures allowing illumination therethrough; circuitry means for electrically coupling said LED strip to running and braking lights of a boat trailer towing vehicle; and a transparent plastic tube rotatably positioned over guidepost;
    whereby said guide post is secured to the boat trailer chassis for use in centering a boat on the boat trailer wherein each said guide post provides repeater illumination of braking, turning, and night lights for the boat trailer towing vehicle visible across substantially the length of each guide post.

2. The lighted boat guide post according to claim 1 wherein said plurality of LED's are located on a removable printed circuit board positioned within said post to cause LED operation via predetermined programs.

3. The lighted boat guide post according to claim 1 wherein said transparent tube is constructed from polycarbonate.

4. A lighted boat guide post for use in centering a boat on a boat trailer and for providing running lights for the boat trailer, said lighted boat guide post comprising:
    a first and second guide post, each said guide post formed from a tube having a proximal end and a distal end defining a length there between, said guide post being having at least a partially transparent cross section throughout substantially the entire length thereof, said proximal end of each guide post mounted to the chassis of said boat trailer with said distal end positioned vertically therefrom and extending above the side of the boat;
    illumination means disposed within said transparent cross section of said guide post;
    circuitry means for electrically coupling said illumination means to running and braking lights of a boat trailer towing vehicle;
    whereby each said guide post is secured to the boat trailer chassis for use in centering a boat on the boat trailer wherein each said guide post provides repeater illumination of braking, turning, and night lights for the boat trailer towing vehicle visible across substantially the length of each upright guide.

5. The lighted boat guide post according to claim 4 wherein said illumination means is a lighting strip positioned within said guide post allowing illumination through said transparent cross section.

6. The lighted boat guide post according to claim 5 wherein said lighting strip is a reflective film placed with an illumination source placed along the distal end of said guide post to prevent saltwater immersion of said illumination source.

7. The lighted boat guide post according to claim 6 wherein said reflective film is a flexible sheet of prismatic material for reflections, refraction, and diffusion through said transparent cross section.

8. The lighted boat guide post according to claim 4 wherein said illumination means is defined as a strip shaped circuit board having a plurality of LED's placed along said strip, said LED's aimed at said cross sectional transparent section.

9. The lighted boat guide post according to claim 8 wherein said plurality of LED's includes a printed circuit board to cause LED operation via predetermined programs.

10. The lighted boat guide post according to claim 4 wherein said transparent cross section is further defined as a colored side marker lens.

11. The lighted boat guide post according to claim 4 wherein said guide post is constructed from polycarbonate with said transparent section having diffuse refraction characteristics.

12. The lighted boat guide post according to claim 4 wherein said illumination source is a halogen lamp.

13. A lighted boat guide post for use in centering a boat on a boat trailer and for providing running lights for the boat trailer, said lighted boat guide post comprising:
    a first and second guide post, each said guide post formed from a tube having a proximal end and a distal end defining a length there between, said guide post being resilient and having a partially transparent cross section throughout substantially the entire length thereof, said proximal end of each guide post mounted to the chassis of said boat trailer with said distal end positioned vertically therefrom and extending above the side of the boat;

a lighting strip positioned within said guide post allowing illumination through said transparent cross section and disposed within said transparent cross section of said guide post;

circuitry means for electrically coupling said lighting strip to running and braking lights of a boat trailer towing vehicle;

whereby each said guide post is secured to the boat trailer chassis for use in centering a boat on the boat trailer wherein each said guide post provides repeater illumination of braking, turning, and night lights for the boat trailer towing vehicle visible across substantially the length of each upright guide.

14. The lighted boat guide post according to claim 13 wherein said lighting strip includes a reflective film placed between said distal end and said proximal end for enhanced illumination.

15. The lighted boat guide post according to claim 13 wherein said reflective film is a prismatic material.

16. The lighted boat guide post according to claim 13 wherein said illumination source is a halogen lamp.

17. A lighted boat guide post for use in centering a boat on a boat trailer and for providing running lights for the boat trailer, said lighted boat guide post comprising:

a first and second guide post, each said guide post formed from a tube having a proximal end and a distal end defining a length there between, said guide post being resilient and having a partially transparent cross section throughout substantially the entire length thereof, said proximal end of each guide post mounted to the chassis of said boat trailer with said distal end positioned vertically therefrom and extending above the side of the boat;

a strip shaped circuit board having a plurality of LED's positioned within said guide post allowing illumination through said transparent cross section disposed within said transparent cross section of said guide post;

circuitry means for electrically coupling said lighting strip to running and braking lights of a boat trailer towing vehicle;

whereby each said guide post is secured to the boat trailer chassis for use in centering a boat on the boat trailer wherein each said guide post provides repeater illumination of braking, turning, and night lights for the boat trailer towing vehicle visible across substantially the length of each upright guide.

18. The lighted boat guide post according to claim 17 wherein said plurality of LED's includes a printed circuit board to cause LED operation via predetermined programs.

19. The lighted boat guide post according to claim 17 wherein said guide post is constructed from polycarbonate with said transparent section having diffuse refraction characteristics.

\* \* \* \* \*